Figure 1:
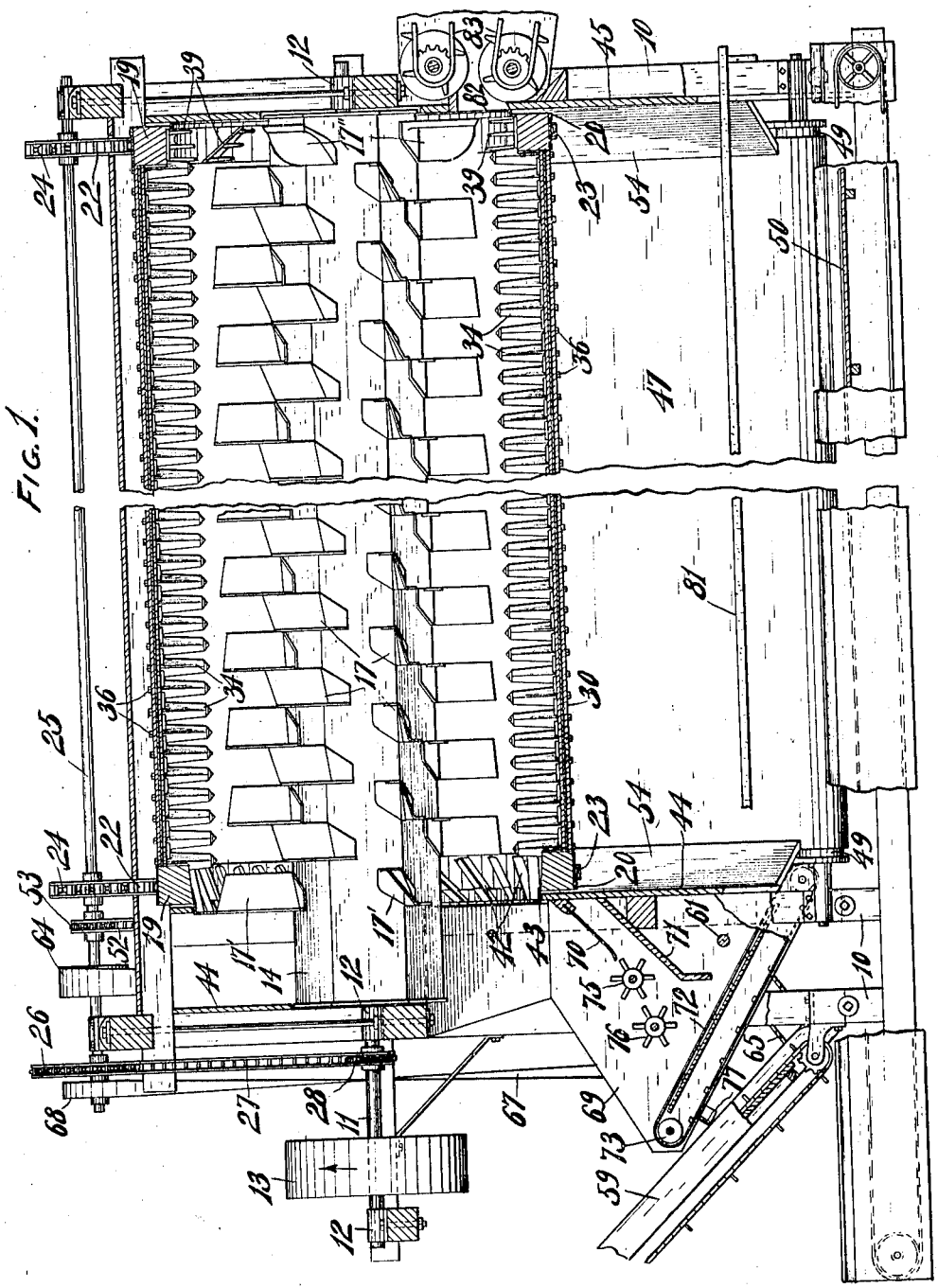

F. HAMACHEK.
PEA HULLER AND SEPARATOR.
APPLICATION FILED JUNE 22, 1910.

1,035,184.

Patented Aug. 13, 1912.
7 SHEETS—SHEET 2.

WITNESSES.

INVENTOR.
Frank Hamachek,
By Benedict, Morsell & Caldwell
ATTORNEYS.

F. HAMACHEK.
PEA HULLER AND SEPARATOR.
APPLICATION FILED JUNE 22, 1910.
1,035,184.
Patented Aug. 13, 1912.
7 SHEETS—SHEET 5.
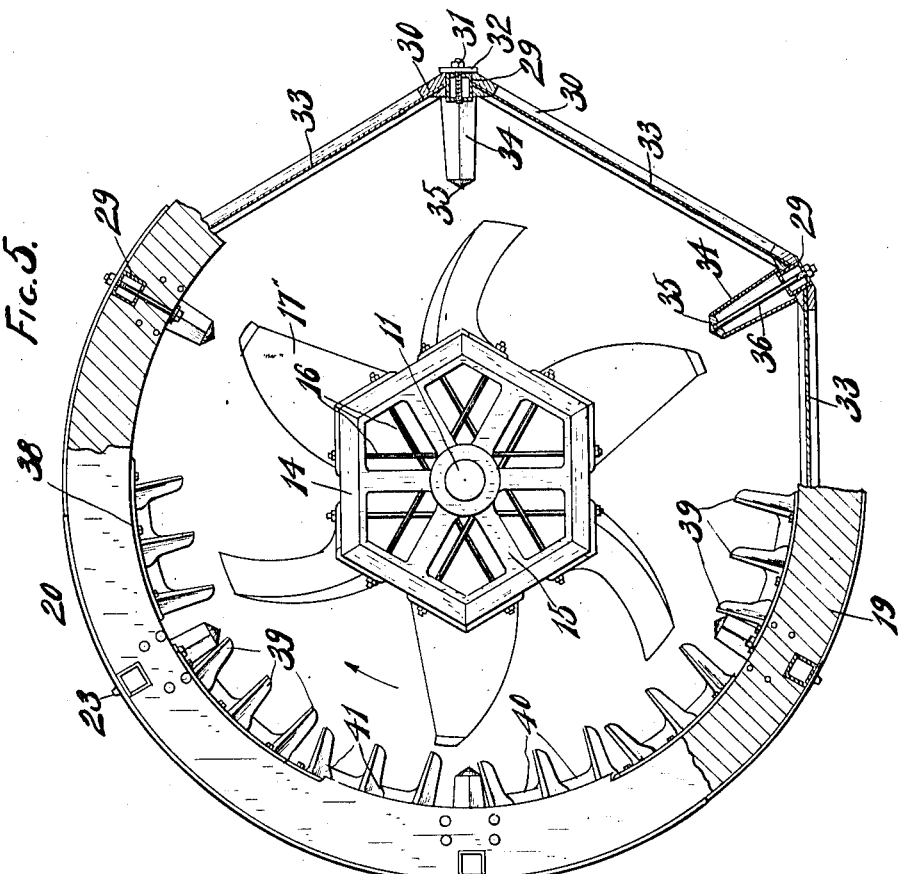
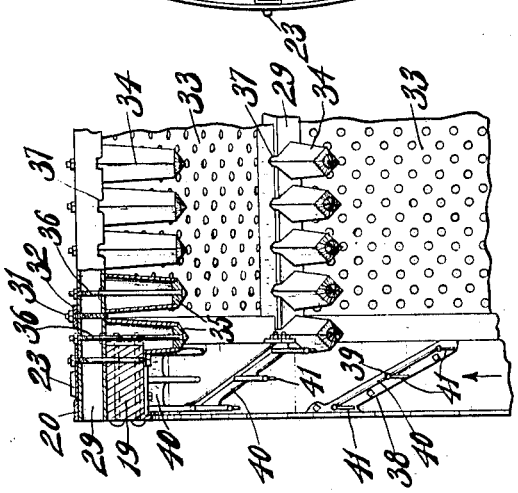
WITNESSES.
INVENTOR
Frank Hamachek
By Benedict, Morsell & Caldwell
ATTORNEYS.

F. HAMACHEK.
PEA HULLER AND SEPARATOR.
APPLICATION FILED JUNE 22, 1910.
1,035,184.
Patented Aug. 13, 1912.
7 SHEETS—SHEET 6.
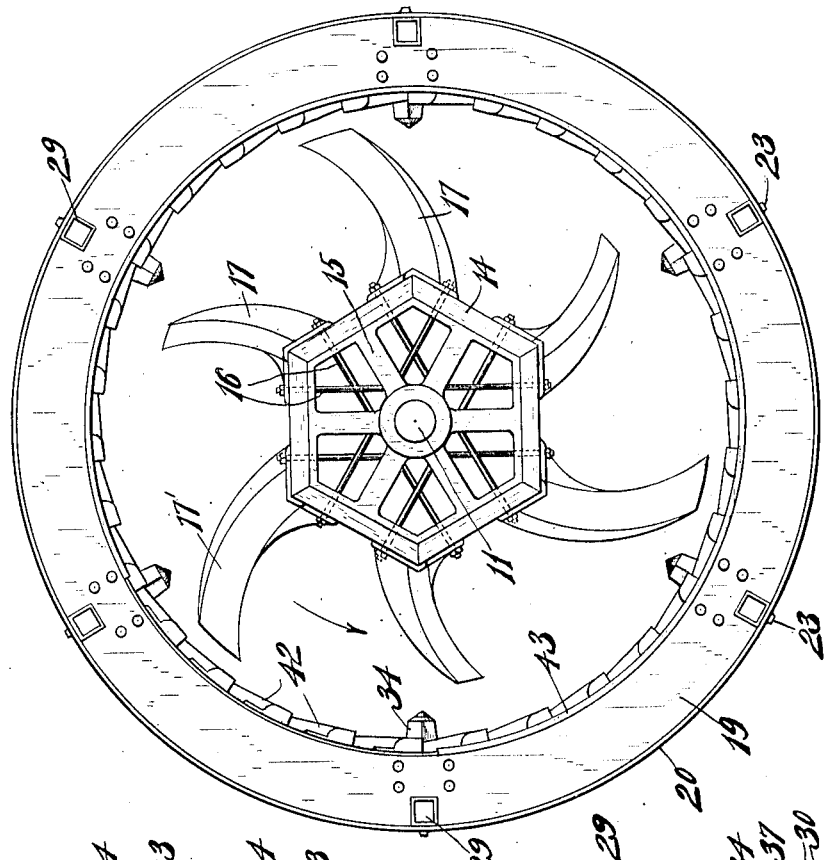
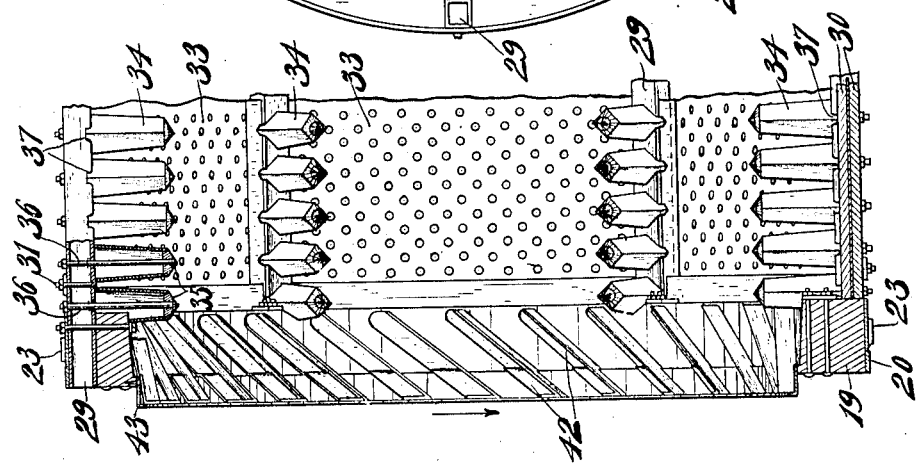
WITNESSES.
INVENTOR.
Frank Hamachek,
By Benedict, Morsell & Caldwell
ATTORNEYS.

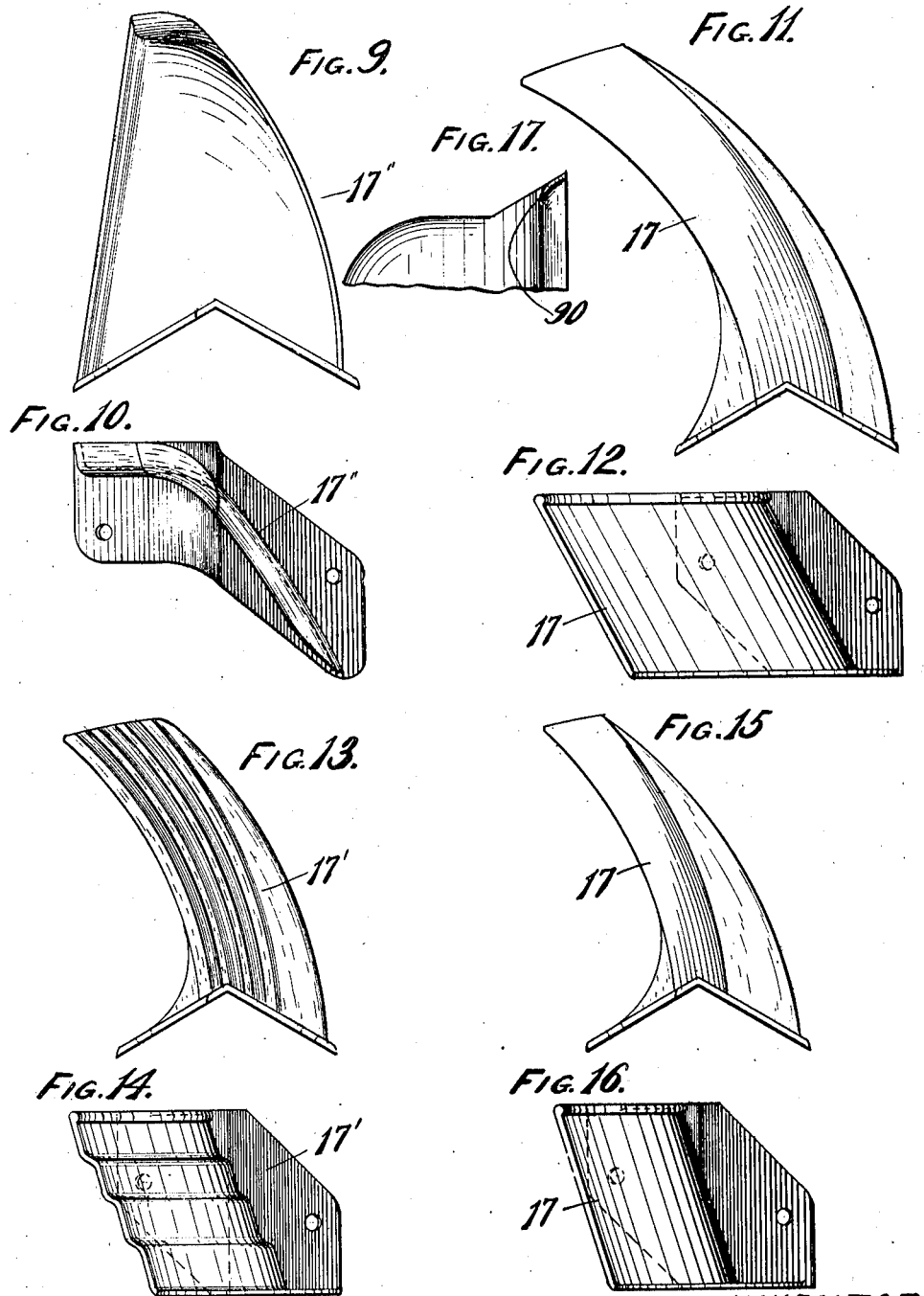

UNITED STATES PATENT OFFICE.

FRANK HAMACHEK, OF KEWAUNEE, WISCONSIN.

PEA HULLER AND SEPARATOR.

1,035,184.

Specification of Letters Patent. Patented Aug. 13, 1912.

Application filed June 22, 1910. Serial No. 568,254.

*To all whom it may concern:*

Be it known that I, FRANK HAMACHEK, residing in Kewaunee, in the county of Kewaunee and State of Wisconsin, have invented new and useful Improvements in Pea Hullers and Separators, of which the following is a description, reference being had to the accompanying drawings, which are a part of this specification.

This invention has for its object to provide a pea huller and separator which will quickly open the pea pods by impact hulling beaters and will readily separate the hulled peas from the vines and the pea hulls and peas from the vines and the pea hulls and effectively prevent the vines from becoming bunched by means of finger bars which lift the vines and drop them gradually upon the rotating beaters, the hulled peas being free to pass between the fingers of the finger bars while the vines and pods are carried thereby.

Another object of the invention is to provide a pea huller with rotary hulling beaters of such shape as to constitute a propeller for forcing a current of air through the device to advance the vines therethrough.

Another object of the invention is to provide a pea huller with a separating sieve drum provided with obliquely positioned series of rake teeth at its mouth or receiving end which will engage the vines being fed to the drum and draw them out to untangle them before dropping them against rotating beaters, said series of teeth being provided with webs and fins to form pockets to retain peas which may fall therein during the descent of said fingers and thus prevent the peas rolling out of the cylinder.

Another object of the invention is to provide the discharge end of the cylinder with inclined blades or vanes with backwardly turned outer ends to form pockets for holding peas which may fall therein during the descent of said fingers and thus prevent the peas rolling out of the cylinder.

Another object of the invention is to provide the discharge end of the cylinder with inclined blades or vanes with backwardly inclined blades or vanes with backwardly turned outer ends to form pockets for holding peas which may fall therein during the descending movement thereof and prevent their passing out of the cylinder, and which vanes form inclined guides in their ascending movement for returning such peas to the cylinder.

Another object of this invention is to provide a separator for tailings, preferably of ribbed rollers, operated at different speeds, over which the tailings from the sieve drum pass and have the loose peas shaken therefrom.

Another object of the invention is to provide the hulling beaters of a pea huller with a longitudinal curvature which will prevent their blowing the vines radially against the walls of the sieve drum to interfere with the peas passing out of the openings thereof.

Another object of the invention is to prevent the crushing of peas between the hulling beaters and the lifting bars of a sieve drum by forming said lifting bars with fingers for gradually releasing the vines to prevent their bunching and to afford space between the fingers in which the vines may yield instead of being crushed.

Another object of this invention is to provide the hulling beaters of a pea huller at the receiving end thereof with spurs or projections which are adapted to hook into the vines and string them out as they enter the separator, such projection being so constructed that they may easily discharge the material at a high point where they may fall upon the other beaters.

Another object of the invention is to improve upon the general details of construction of pea hullers.

With the above and other objects in view the invention consists in the pea huller and separator herein claimed and all equivalents.

Figure 2:
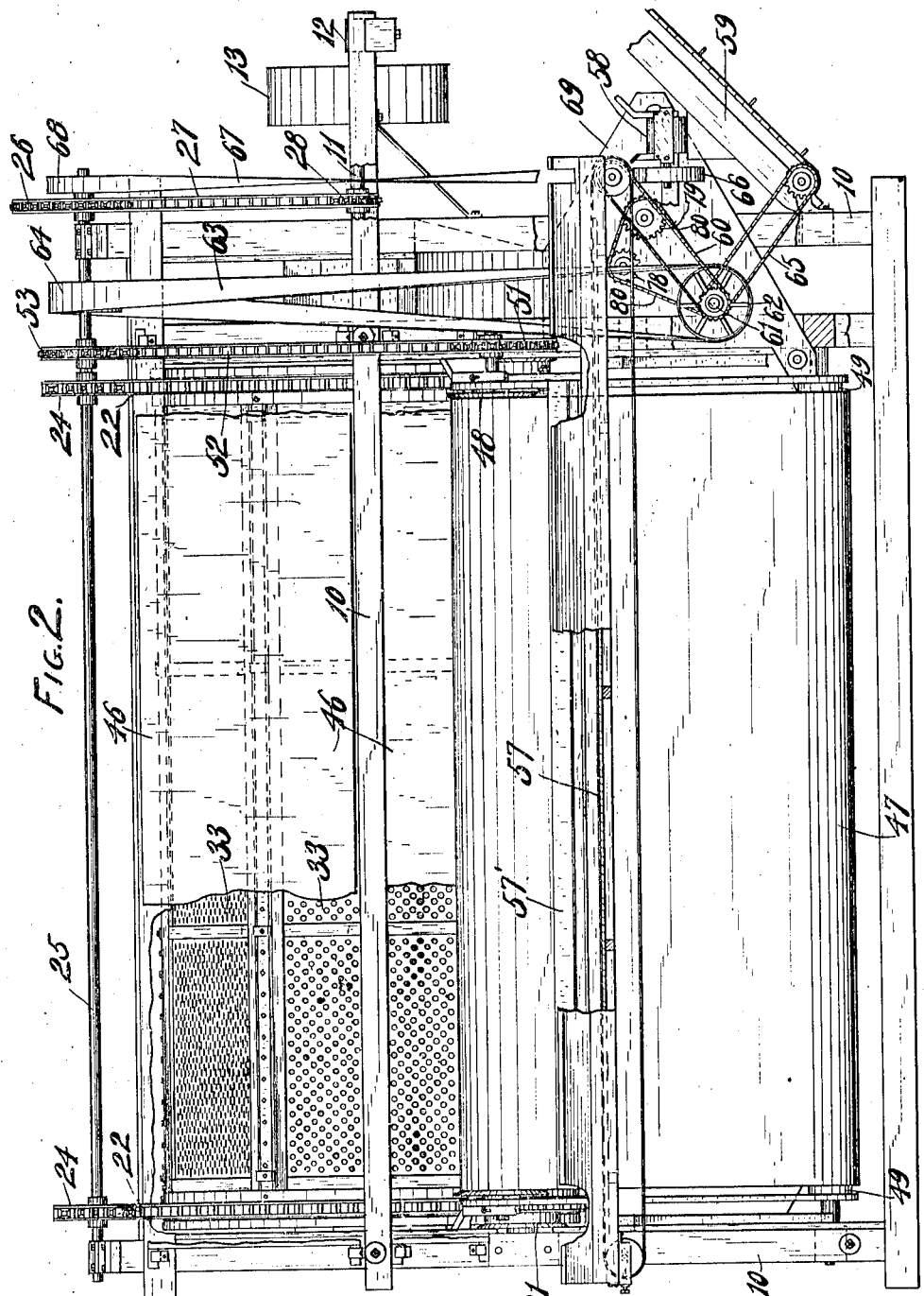
Figure 3:
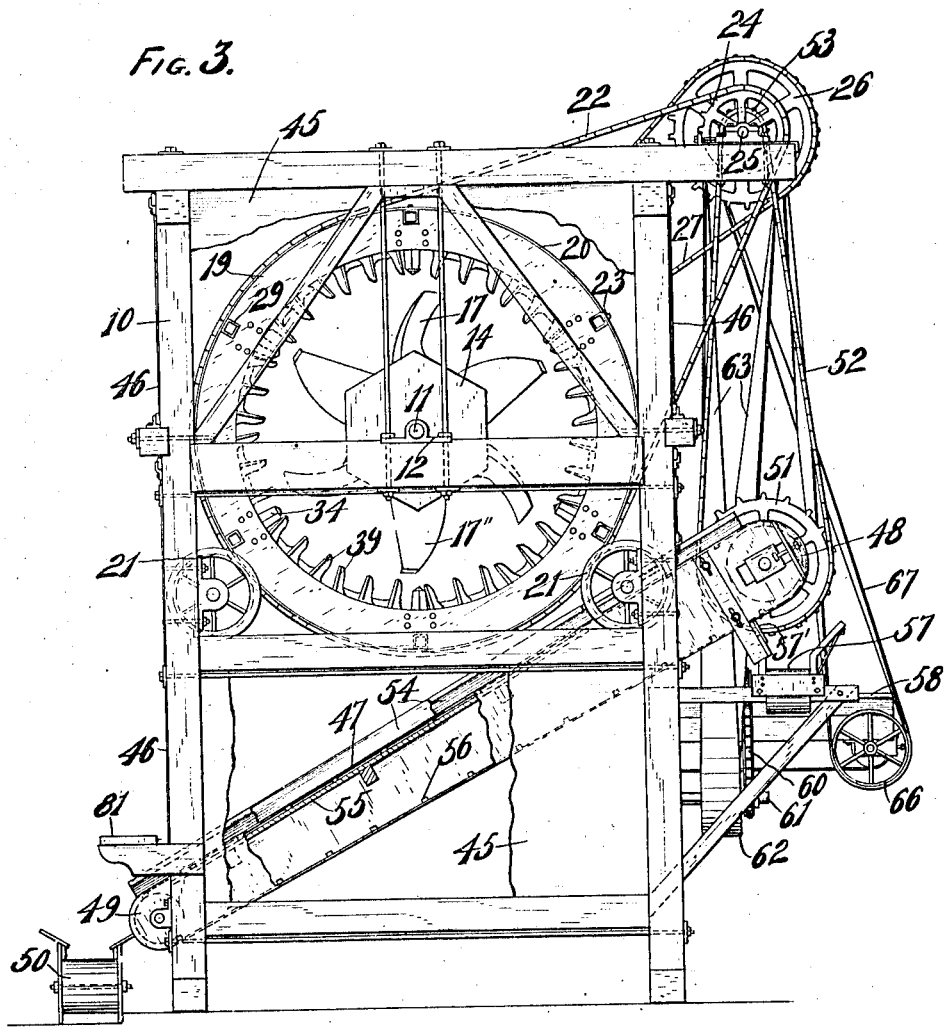
Figure 4:
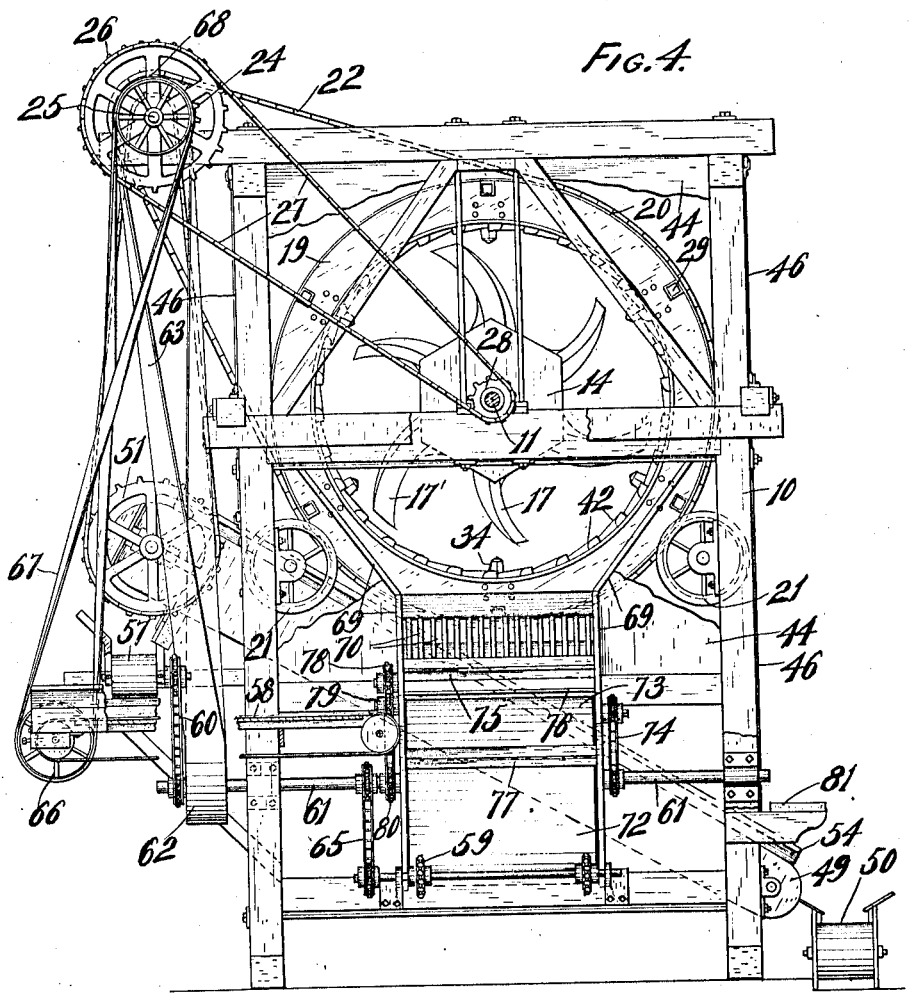

Referring to the accompanying drawings in which like characters of reference indicate the same parts in the different views; Figure 1 is a longitudinal sectional view of a pea huller and separator constructed in accordance with this invention with the intermediate portion broken away; Fig. 2 is an elevation thereof from the other side of the machine, with parts broken away; Fig. 3 is an end elevation thereof at the feed end of the drum; Fig. 4 is a similar view thereof at the discharge end of the drum; Fig. 5 is a sectional elevation of the drum and the hulling beaters at the feed end thereof; Fig. 6 is a detail sectional elevation of the feed end of the drum; Fig. 7 is an elevation of the discharge end of the drum and hulling beaters; Fig. 8 is a detail sectional elevation of the discharge end of the drum; and, Figs. 9 to 17 inclusive are detail elevations and plan views of the several forms of hulling beaters preferably employed.

In these drawings 10 indicates a frame of any suitable construction which has a shaft 11 journaled through it in bearings 12. This shaft carries a pulley 13 by means of which it may be driven from any suitable source of power. Between the bearings 12 the shaft has mounted on it a hexagonal or other desirably shaped body portion 14, preferably formed as shown in Figs. 5 and 7 of mitered boards or plates surrounding hexagonal spider frames 15 with tie bolts 16 connecting the opposite boards together and clamping them against the frames. The body portion 14 is provided with hulling beaters 17 which may be variously shaped, but which are preferably clamped in place by the bolts 16 referred to and are oblique with relation to the axis of the body portion so that the turning movements of the shaft 11 cause them to act as propellers or fan blowers for causing a current of air to flow in the direction of the rear or discharge end of the machine, where the pulley 13 is located.

Surrounding the body 14 with its hulling beaters is a sieve drum which has circular ends or heads 19 with metal bands or tracks 20 thereon which ride on rollers 21 on the frame to support the drum within the frame and permit it to rotate about the shaft 11 as its axis. A rotary movement is given to the drum by means of chains 22 which engage occasional lugs or sprocket teeth 23 on the heads 19 of the drum and which chains also travel around sprocket wheels 24 on a countershaft 25 which is journaled at the upper part of the frame and is driven from the shaft 11 by means of a sprocket wheel 26 on the shaft 25 connected by a chain 27 with a sprocket wheel 28 on said shaft 11. The direction of rotation of the drum is the same as the direction of rotation of the hulling beaters, but its speed is much slower.

The construction of the sieve drum is particularly important, and as here shown the rings 19 at its ends are connected at intervals by longitudinal vine lifting rods 29 which are preferably square tubes, as best shown in Fig. 5. These longitudinal rods have rectangular sieve frames 30 secured to them by means of bolts 31 with washers 32 overlapping the edges of adjacent frames 30, said frames containing perforated plates 33 forming screens or sieves through the openings of which the hulled peas may freely pass. Besides supporting the panels of framed screens the longitudinal rods 29 preferably have mounted on them a row of closely spaced sifting fingers 34 which, as shown in Figs. 5, 6 and 8, are desirably tubular with beveled or pointed end pieces 35 fitting in their inner ends and bolts 36 passing through said end pieces and the square tubes 29 with nuts threaded on them and bearing against the square tubes. These fingers are preferably tapering and square in cross section and are positioned so that they are in alinement diagonally, their bases having the square tubes 29 let into them slightly so that their projecting corners engage the opposite sides of the square tubes as lugs 37 to prevent their turning on the bolts.

At the front or feed end of the drum the ring 19 has mounted on it a series of obliquely positioned plates 38 with inwardly extending rake teeth 39 thereon connected at their bases by webs 40 and with rearwardly extending fins 41 extending their full length, as best shown in Figs. 5 and 6. At the rear or discharge end of the drum the ring 19 has mounted in it a series of obliquely positioned angle ribs or vanes 42 with rearwardly turned ends contained within a flanged extension hoop 43, which in effect carries the drum through an end plate 44 of the frame, shown in Fig. 1, which serves to confine the hulled peas to the space between it and a similar end plate 45 at the other end of the drum. These end plates fit close to the rings 19 to effect a closure and cloth curtains 46 or the like inclose the sides of the space containing the drum to prevent the peas being lost.

Beneath the drum and extending the full length thereof is an inclined separating apron 47 which is preferably in the form of an endless belt passing around a flanged roller 48 at its upper part on one side of the frame and around a roller 49 at its lower part on the other side of the frame, the movement of said apron being upwardly to carry off the dirt and chaff falling through the screens of the drum while permitting the peas, by reason of their spherical shape, to roll down thereon and be collected by a trough conveyer 50. Motion is given to the apron 47 by means of a sprocket wheel 51 carried by the collar 48, which is connected by a chain 52 with a sprocket wheel 53 on the countershaft 25.
Cover boards 54 are secured to the end plates 44 and 45 to lead the peas onto the apron and prevent them from rolling off thereof. The apron is preferably of canvas and rides upon an inclined decking 55, as shown in Fig. 3, and is stiffened laterally by means of cross slats 56, preferably of sheet metal, secured at intervals to its under surface.

The dirt and chaff separated from the peas by means of the upwardly moving apron 47 are dropped over the roller 48 into a waste carrier 57, the dirt being scraped from the surface of the apron by means of a scraper blade 57' bearing thereon. The waste carrier 57 conveys the dirt and chaff to the rear end of the machine where it is dumped onto a cross waste carrier 58, which in turn dumps it onto an inclined conveyer or stacker 59 which receives the tailings from the discharge end of the drum. The waste carrier 57 is driven by a chain 60 connecting a sprocket on its rear roller with a sprocket wheel on a shaft 61 which carries a pulley 62 connected by a belt 63 with a pulley 64 on the countershaft 25. The straw and waste carrier 59 is also driven by having a chain connection 65 with a sprocket wheel on the shaft 61 before referred to. The cross waste carrier 58 is driven by having a pulley 66 on one of its rollers connected by means of a crossed belt 67 with a pulley 68 on the countershaft 25.

As shown in Fig. 4 the discharge end of the drum has beneath it a hopper shaped frame 69 to catch the vines and pods as they are discharged from the drum and this waste material first drops upon a series of spaced curved fingers 70 to allow any peas which may be contained therein to fall through onto an inclined guide 71 which will deliver them upon an inclined upwardly moving apron 72 which constitutes a separator for tailings, the peas rolling down the inclined apron notwithstanding its upward movement and being delivered thereby into a receptacle, not shown, which may be provided for them beneath the main separating apron. The separating apron 72 is similar in construction to the separator apron 47 and is driven by having its upper roller 73 connected by a chain 74, see Fig. 4, with the shaft 61 previously referred to. This shaft 61 further serves to drive a pair of ribbed rollers 75 and 76 in the hopper-like frame 69 which are in position to receive the vines and hulls as they drop from the fingers 70 and by their rapid movements at different speeds they serve to pull the vines apart and to thoroughly shake them up to remove loose peas therefrom which may drop onto the separator apron 72, the waste material also falling onto the apron 72 and being carried upwardly thereby and discharged into the straw and waste carrier 59. A scraper 77 engages the apron 72 after it has passed around the roller 73 to scrape the dirt therefrom onto the waste carrier. These ribbed rollers 75 and 76 are driven from the shaft 61 at different speeds by having sprocket wheels 78 and 79 respectively which are of different sizes and are driven by a chain 80 from the shaft 61.

A step plank 81 extends along the front side of the frame, above the lower end of the main separator apron 47, from which access may be had to the parts for repair or observation.

In operation, the pea vines containing the peas are fed through the feed opening 82 in the end plate 45, preferably by means of a feeder 83, such as that covered by my Letters Patent No. 952,520, dated March 22, 1910, and on entering the drum they are first engaged by the rake teeth 39 and are drawn out thereby to straighten and untangle them and are carried along with the movement of the drum until the rake teeth slant sufficiently for them to slide off and fall upon the hulling beaters 17. The upwardly moving hulling beaters by striking the falling vines a glancing blow, due to their oblique positions on the body portion, serve to break open the pods and liberate the peas, and at the same time the current of air through the drum from the feed end to the discharge end, caused by said oblique position of the beaters gives the vines a tendency to move toward the discharge end of the drum so that when they again land they will be engaged by the fingers 34 and be again carried upward to repeat the operation of falling upon the upwardly moving beaters to open the pods. The peas which are released from the opened pods promptly escape from the drum by passing through the openings in the perforated screens 33 and the finger sieves 34 which lift the vines, are incapable of carrying the loose peas up also, for the peas quickly pass through the openings between the fingers and travel over the next sieve frame to find openings through which they may pass out. On the peas passing through the openings in the walls of the drum they fall upon the upwardly moving apron 47 together with a quantity of dirt and chaff. The dirt and chaff lodge on the apron and travel upwardly with it and are dumped into the waste conveyer 57, being scraped from the apron by the scraper 57', while the peas by reason of their spherical shape roll down the apron into the conveyer 50 by which they are taken to a convenient place for the packing process. The vines lifted by the finger sieves are not dumped in bunches so as to ball up and interfere with the operation of the machine, but are gradually dropped, by reason of the rake like formation of the finger bars, thus remaining thin and evenly distributed throughout the length of the drum and repeatedly receiving the blows of the hulling beaters to thoroughly perform the operation of breaking open the pods and liberating the peas. The vines lifted by the finger sieve bars receive a continuous spreading or untangling effect, for when they drop from the finger sieve bars, they do so gradually, portions remaining hooked upon the fingers, and by the action of the faster moving beaters they are worked into thinner and thinner layers. Because of the vines being thus spread into thin layers, the pods may be more easily opened by impact. When vines are lifted by smooth cross bars, they have a tendency to roll off easily in bunches and so ball up and interfere with the working of the machine and the tender peas which have been opened or which remain unopened, are carried along therewith and are wasted. The vines are gradually fed by the glancing blows of the beaters and by the current of air toward the discharge end of the drum.

The object is to keep the vines in the air as much as possible and the action of the hulling beaters serves this purpose, the vines being struck and lifted each time they begin to fall. The longitudinal curvature of the hulling beaters by which they present a concave face in advance prevent their blowing the vines outwardly against the perforated walls of the drum where they would interfere with the peas passing out. The hulling beaters 17' at the discharge end of the drum are more oblique in their position on the body portion 14, to more quickly eject the vines from the drum and likewise the first set of hulling beaters 17'' at the receiving end of the drum are scoop shaped and are provided with a projection 90 on their outer edge to more quickly catch up the vines as they enter through the feed opening 82 and assist the rake teeth 39 in drawing them in thin layers into the drum. The intermediate hulling beaters 17 also are at different angles to vary the feed of the vines as desired and to spread them in thin layers.

The oblique position of the bases and the webs 40 of the rake teeth 39 causes them on their ascending movement to deflect peas which may lodge thereon, away from the end of the drum and toward the sieves, while said webs and the fins 41 form pockets to hold the peas against deflection toward the end of the drum on the descending movement. Likewise the oblique position of the blades or pea guides 42 at the discharge end of the drum causes them to deflect the peas inwardly and away from the open end of the drum on their ascending movement, and on their descending movement their rearwardly bent ends form pockets to hold the peas against being deflected outwardly.

The vines discharged from the drum fall onto the fingers 70 between which loose peas may pass and said vines are further separated and agitated by traveling the ribbed rollers 75 and 76 turning at different speeds so as to have the vines spread apart and the loose peas shaken therefrom upon the lower portion of the upwardly moving apron 72, the vines themselves being carried up by the upper end of said apron and discharged upon the waste conveyer 59 which carries them wherever desired. The peas and such chaff as may fall on the apron 72 are separated in the same manner as with the apron 47, the chaff traveling upwardly to be discharged and scraped from the apron by the scraper 77 into the waste conveyer 59 while the peas roll down the apron 72 to be collected in a suitable receptacle, not shown.

The action of the finger sieves in distributing the vines in thin untangled layers is not only to more efficiently secure the opening of the pods by freely presenting them to the hulling beaters, but it enables the peas to more quickly pass from the vines onto the sieves so as to be separated from the vines, and thus prevent their being damaged by unnecessarily repeated beatings. Further the hulling beaters in having a thin layer of vines to operate upon may accomplish their work at a lower speed than when they are required to open the pods by striking through a heavy mat of vines.

The feature of the finger sieves is one of considerable importance, as it allows the peas which have been freed from the vines to pass between the fingers so that they may be taken care of more quickly by the revolving sieve drum and thus prevent damaging by useless beating, and further they secure a better separation of the vines as they release the vines gradually instead of dropping them at once, as would be done with smooth bars. The finger bars also permit of the dirt being more quickly discharged and separated from the peas. With pea hullers in which untoothed bars are employed on the drum to lift the vines and drop them in the path of rotating beaters, such bars may interfere with the operation of opening the pea hulls by impact, for the vines will bunch against said bars in quantities which will cause the hulling beaters to crush them against the bars, whereas with the finger bars of this invention such crushing or balling of vines is impossible.

I desire it to be understood that this invention is not limited to any specific form or arrangement of parts except in so far as such limitations are specified in the claims.

What I claim as new and desire to secure by Letters Patent is—

1. A pea huller, comprising a rotary sieve drum, rotary hulling beaters contained within the drum, means for feeding material to the drum, and inwardly projecting rake teeth at the receiving end of the drum adapted to engage the material as it enters the drum and draw it out from the feeding means to untangle the vines and present them to the hulling beaters in a thin sheet.

2. A pea huller, comprising a rotary sieve drum, rotary hulling beaters contained within the drum, means for feeding material to the drum, inwardly projecting rake teeth at the receiving end of the drum arranged in oblique rows and webs between the teeth of each row to form deflectors for preventing the peas from rolling to the end of the drum.

3. A pea huller, comprising a rotary sieve drum, rotary hulling beaters contained within the drum, means for feeding material to the drum, inwardly projecting rake teeth at the receiving end of the drum arranged in oblique rows, webs between the teeth of each row to form deflectors for preventing the peas from rolling to the end of the drum on the ascending movement of the teeth, and fins projecting rearwardly from the rake teeth to form pockets with the webs for holding the peas against outward deflection by the webs on the descending movement of the teeth.

4. A pea huller, comprising a rotary sieve drum, rotary hulling beaters contained within the drum, and finger sieve bars in the drum comprising inwardly projecting spaced fingers forming sieves to allow the hulled peas to pass between the fingers, said finger sieve bars serving to lift the material fed to the drum and allow the same to gradually fall therefrom against the rotary hulling beaters to insure a thorough separation of the peas.

5. A pea huller, comprising a rotary sieve drum, rotary hulling beaters contained within the drum, finger sieve bars in the drum, comprising inwardly projecting spaced fingers secured to the drum with their inner ends farther from the axis of the drum than the outer ends of the hulling beaters so as to be beyond the range of the hulling beaters whereby the fingers operate as a rake to lift the pea vines and drop them into the path of the hulling beaters to be struck thereby while unsupported, the spaces between the fingers extending to near the inner wall of the drum so that the fingers further operate as a sieve to allow the hulled peas to pass between them immediately without being carried along by the sieve bars so that said peas may escape through the openings of the sieve drum whether the peas are on the ascending portion of the drum or the descending portion thereof.

6. A pea huller, comprising a rotary sieve drum, rotary hulling beaters contained within the drum, a finger bar in the drum angular in cross section, and fingers on said finger bar comprising tapering tubular members, beveled heads fitting in the ends of said members, and bolts passing through the heads and through the finger bar for clamping the parts together, the said tubular members having lugs embracing the sides of the finger bar to prevent their turning.

7. A pea huller, comprising a rotary sieve drum, rotary hulling beaters contained within the drum, finger bars in the drum square in cross section, and fingers on said finger bars comprising tapering tubular members, square in cross section, beveled heads fitting in the ends of said members, and bolts passing through the heads and through the finger bars for clamping the parts together, said tubular members being positioned so that their diagonals cross the finger bars and provided with lugs at the opposite edges thereof to embrace the sides of the finger bars between them.

8. A pea huller, comprising a rotary sieve drum, a shaft extending through the drum, a body portion mounted on the shaft comprising polygonal frames fixed on the shaft, and plates bearing on the faces of the frames, hulling beaters mounted on the body portion at the angles formed by the meeting edges of the plates, and bolts passing through the opposite plates and the hulling beaters for clamping the plates in position on the frames and for clamping the hulling beaters to the body portion.

9. A pea huller, comprising a rotary sieve drum, and rotary hulling beaters contained within the drum having their ends bending in the direction of their rotation to avoid their fanning the pea vines against the walls of the sieve drum.

10. A pea huller, comprising a rotary sieve drum, and rotary hulling beaters contained within the drum having their ends bending in the direction of their rotation to avoid their fanning the pea vines against the walls of the sieve drum and being positioned obliquely with relation to the axis of the drum to produce a fanning action to feed the vines through the drum.

11. A pea huller, comprising a rotary sieve drum, and rotary hulling beaters contained within the drum having their ends bending in the direction of their rotation to avoid their fanning the pea vines against the walls of the sieve drum and being positioned obliquely with relation to the axis of the drum to produce a fanning action to feed the vines through the drum, the oblique position of the hulling beaters being of different degrees of angularity at different parts of the drum to cause a more rapid feed of vines at some parts than at others.

12. A pea huller, comprising a rotary sieve drum, and rotary hulling beaters contained within the drum having their ends bending in the direction of their rotation to avoid their fanning the pea vines against the walls of the sieve drum and being positioned obliquely with relation to the axis of the drum to produce a fanning action to feed the vines through the drum, the oblique positions of the hulling beaters being at a greater angularity with relation to the axis of the drum at the ends of the drum than at the intermediate parts thereof to cause a quicker feeding of the vines at such places.

13. A pea huller, comprising a rotary sieve drum, bars therein provided with inwardly extending fingers spaced apart and forming means for lifting vines and dropping them, and rotary hulling beaters extending in the direction of their rotation to prevent the fanning of the vines against the walls of the sieve drum and positioned obliquely with relation to the axis of the drum to strike the vines dropped by the fingers with a glancing blow to direct them toward the discharge end of the drum, such oblique position of the hulling beaters serving to cause a fanning action to feed the vines through the drum.

14. A pea huller, comprising a rotary sieve drum having ring-like heads at its ends connected by bars square in cross section, tracks on the heads, a suitable frame, rollers mounted on the frame and supporting the drum by means of said tracks, teeth projecting from the heads, suitably driven chains surrounding the heads and engaging the teeth for driving the drum, sieve frames containing perforated sheets forming the walls of the drum and bearing against the bars and the heads, bolts passing through the bars, washers on the bolts engaging the edges of adjacent frames for holding them in position, tapering square fingers secured to the square bars and projecting inwardly, and rotary hulling beaters contained within the drum.

15. A pea huller, comprising a rotary sieve drum, vine lifting bars therein, rotary hulling beaters contained in the drum, and pea guides at the discharge end of the drum comprising obliquely positioned inwardly extending ribs adapted to guide the peas inwardly in their ascending movement and provided with rearwardly extending outer ends to form pockets for holding the peas against their falling out of the drum during their descending movement.

16. A pea huller, comprising a rotary sieve drum, vine lifting bars contained therein, rotary hulling beaters within the drum, rake teeth at the receiving end of the drum in lines oblique to the axis of the drum and connected by webs at their outer parts and having rearwardly extending fins, said rake teeth serving to draw the vines into the drum and spread them out to untangle them and to lift them and then permit them to fall against the hulling beaters, the webs between the rake teeth forming pea guides to guide the peas inwardly on their ascending movement and to form pockets with the fins to hold the peas against falling outwardly on their descending movement, and pea guides at the discharge end of the drum comprising obliquely positioned ribs with rearwardly turned outer ends to guide the peas inwardly during their ascending movement and to form pockets for retaining the peas during their descending movement.

17. A pea huller, comprising a rotary sieve drum, and rotary hulling beaters contained therein, the said hulling beaters at the receiving end of the drum being provided with projections at their outer edges to hook into the material as it enters the drum and draw it out into a thin layer.

18. A pea huller comprising a rotary sieve drum, curved fingers to receive the vines from the discharge end of the drum permitting the loose peas to drop therethrough, and a series of ribbed rollers operating at different speeds to take the vines away from the curved fingers and shake the loose peas therefrom.

19. A pea huller, comprising a rotary sieve drum, rotary hulling beaters contained within the drum, and approximately radial sieves within the drum and secured thereto with their inner edges farther from the axis of the drum than the outer ends of the hulling beaters so as to be out of the reach of the hulling beaters, whereby the sieves serve to lift the pea vines and drop them into the path of the hulling beaters to be struck thereby while unsupported, said sieves having openings extending to near the inner wall of the drum to allow the hulled peas to pass therethrough immediately without being carried along by the sieve so that the said peas may escape through the openings of the sieve drum whether the peas are on the ascending portion of the drum or the descending portion thereof.

In testimony whereof, I affix my signature, in presence of two witnesses.

FRANK HAMACHEK.

Witnesses:
IRVIN F. SNYDER,
GEO. W. LINDSAY.